United States Patent
Matsui et al.

(10) Patent No.: US 10,349,073 B2
(45) Date of Patent: Jul. 9, 2019

(54) DECODING DEVICE, IMAGE TRANSMISSION SYSTEM, AND DECODING METHOD

(71) Applicant: Kabushiki Kaisha Toshiba, Minato-ku, Tokyo (JP)

(72) Inventors: Hajime Matsui, Yokohama Kanagawa (JP); Shuou Nomura, Yokohama Kanagawa (JP); Akira Moriya, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 464 days.

(21) Appl. No.: 15/054,978

(22) Filed: Feb. 26, 2016

(65) Prior Publication Data

US 2017/0078682 A1 Mar. 16, 2017

(30) Foreign Application Priority Data

Sep. 10, 2015 (JP) .................................. 2015-178101

(51) Int. Cl.
*H04N 19/44* (2014.01)
*H04N 19/426* (2014.01)
*H04N 19/172* (2014.01)
*H04N 19/127* (2014.01)
*H04N 19/152* (2014.01)

(52) U.S. Cl.
CPC ........... *H04N 19/44* (2014.11); *H04N 19/127* (2014.11); *H04N 19/152* (2014.11); *H04N 19/172* (2014.11); *H04N 19/426* (2014.11)

(58) Field of Classification Search
CPC .......................... H04N 19/127; H04N 19/152
See application file for complete search history.

(56) References Cited

U.S. PATENT DOCUMENTS

| | | | |
|---|---|---|---|
| 6,347,117 B1 | 2/2002 | Kato et al. | |
| 6,535,556 B1 | 3/2003 | Kato et al. | |
| 7,706,377 B2 * | 4/2010 | Van Der Wolf | H04N 19/159 370/390 |
| 8,306,110 B2 | 11/2012 | Togita | |
| 2009/0147844 A1 | 6/2009 | Togita | |
| 2009/0257666 A1 * | 10/2009 | Kondou | H04N 19/139 382/233 |

FOREIGN PATENT DOCUMENTS

| | | |
|---|---|---|
| JP | H09-139912 A | 5/1997 |
| JP | 3952509 B2 | 8/2007 |
| JP | 2009-159599 A | 7/2009 |
| JP | 2012-019288 A | 1/2012 |

* cited by examiner

*Primary Examiner* — William C Vaughn, Jr.
*Assistant Examiner* — Jerry T Jean Baptiste
(74) *Attorney, Agent, or Firm* — White & Case LLP

(57) ABSTRACT

A decoding device according to an embodiment includes: a reception memory for storing received image; a frame buffer for storing a reference image; a decoding unit for decoding the received image based on the reference image stored in the frame buffer; a reference image storage for storing the decoded image, decoded by the decoding unit, in the frame buffer as the reference image; and an output image selection unit for selecting the reference image stored in the frame buffer as an output image when the reception memory underflows and selecting the decoded image as the output image when the reception memory does not underflow.

15 Claims, 15 Drawing Sheets ic DECODING DEVICE, IMAGE
TRANSMISSION SYSTEM, AND DECODING
METHOD

CROSS-REFERENCE TO RELATED
APPLICATION

This application is based upon and claims the benefit of priority from the prior Japanese Patent Application No. 2015-178101 filed on Sep. 10, 2015; the entire contents of which are incorporated herein by reference.

FIELD

Embodiments described herein relate generally to a decoding device, an image transmission system, and a decoding method.

BACKGROUND

An image is compressed and then transmitted. Therefore, a receiving device includes a decoding unit for decoding reception data. Generally, a receiving device includes a buffer for retaining reception data, a decoded image, or a reference image in a preceding stage or subsequent stage to the decoding unit or therewithin. The decoding unit is generally provided with a large-capacity buffer in case where image data cannot be received.

It is important that mobile terminals implement low power consumption. However, large-capacity buffers consume a large volume of power and it results in large power consumption of the device. Moreover, large-capacity buffers result in high product cost. To implement low power consumption and low cost, buffers are required to have a smaller capacity.

In addition, it is important that game terminals implement low delay. However, in a device requiring a large-capacity buffer, a delay in image output is large since a certain volume of image data is retained in the buffer and then decoding or outputting of the image starts. To implement low delay in image transmission, buffers are required to have a smaller capacity.

However, a small-capacity buffer is prone to artifacts of output images when a transmission path of the image becomes unstable.

DETAILED DESCRIPTION

Figure 1:
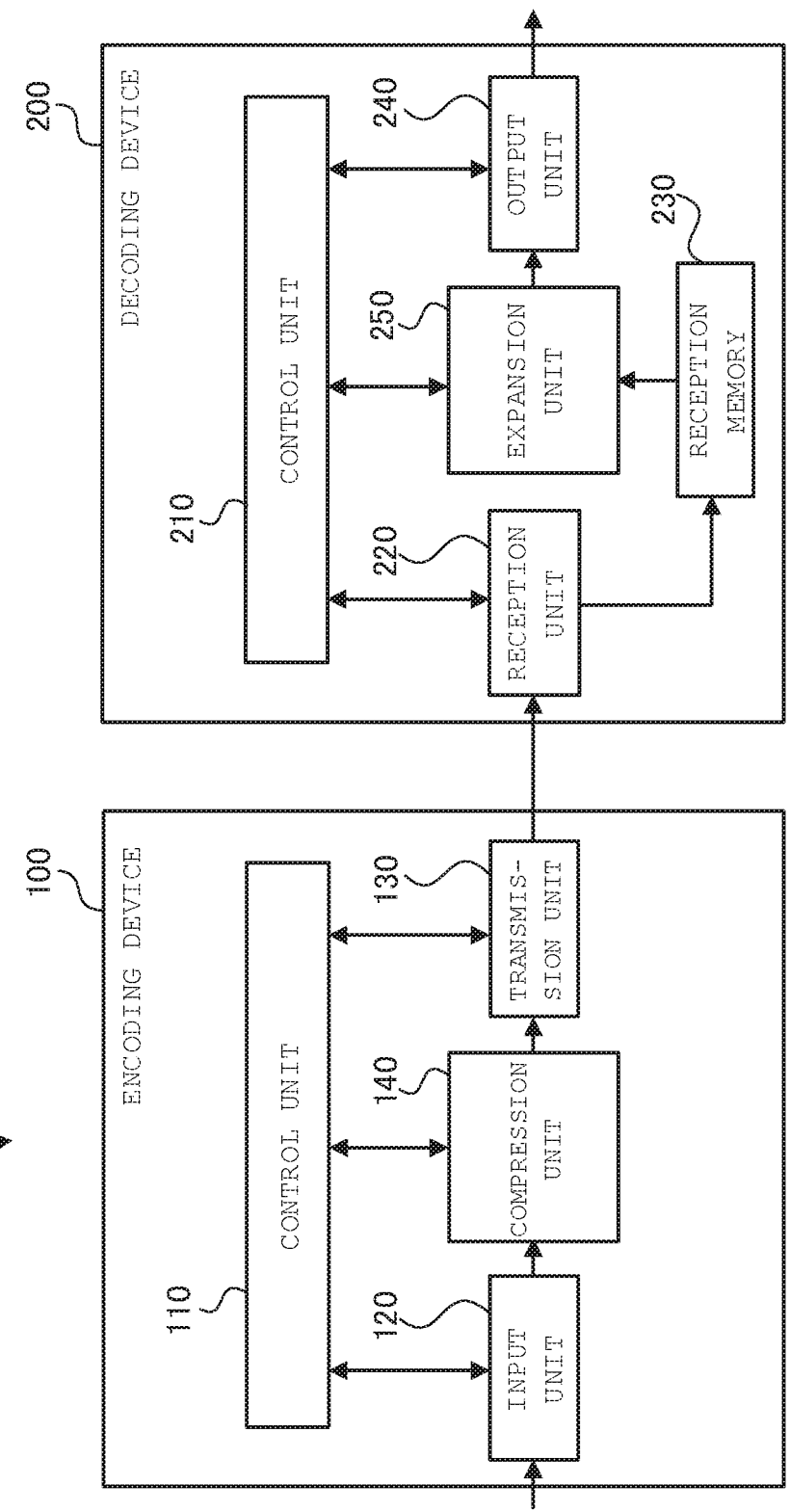
FIG. 1 is a block diagram of an image transmission system according to an embodiment.

A decoding device according to an embodiment includes: a reception memory for storing image received; a frame buffer for storing a reference image; a decoding unit for decoding the image based on the reference image and generating a decoded image; a reference image storage for storing the decoded image in the frame buffer as the reference image; and an output image selection unit for selecting the reference image stored in the frame buffer when the reception memory underflows and selecting the decoded image when the reception memory does not underflow.

Embodiments will be described below with reference to the drawings. Note that a same reference sign is used for a same or an equivalent part in the drawings.

(First Embodiment)

FIG. 1 is a block diagram of an image transmission system according to the present embodiment. The image transmission system 1 includes an encoding device 100 for compressing image and a decoding device 200 for expanding the image received from the encoding device 100. The encoding device 100 is connected to the decoding device 200 via a transmission path. The transmission path may be a communication cable such as a high-definition multimedia interface (HDMI (registered trademark)) cable or a network such as a local area network (LAN) or the Internet. Moreover, the transmission path may be wireless such as a wireless LAN. The encoding device 100 transmits an image stream to the decoding device 200 via the transmission path.

First, a configuration of the encoding device 100 will be described. The encoding device 100 includes a control unit 110, an input unit 120, a transmission unit 130, and a compression unit 140.

The control unit 110 is a processing device, such as a processor, for controlling the respective units of the encoding device 100.

The input unit 120 is an input interface for acquiring an image signal from an external device (e.g. camera). The image signal is stream data, such as an output signal of broadcasting data or camera, which flows without interruption. The input unit 120 generates image data through A/D conversion of the image signal and transmits the image data to the compression unit 140. The image data includes a plurality of uncompressed frames (hereinafter referred to as "input frame").

The compression unit 140 is a processing device that compresses the image data. The compression unit 140 compresses the input frame and transmits the input frame to the transmission unit 130.

The transmission unit 130 is an output interface for transmitting data to the decoding device 200. The transmission unit 130 multiplexes the compressed image data (e.g. a prediction error data, motion vector, and compressed frame). The transmission unit 130 notifies to the compression unit 140 that data transmission to the decoding device 200 has been halted due to a factor such as an external disturbance.

Figure 2:
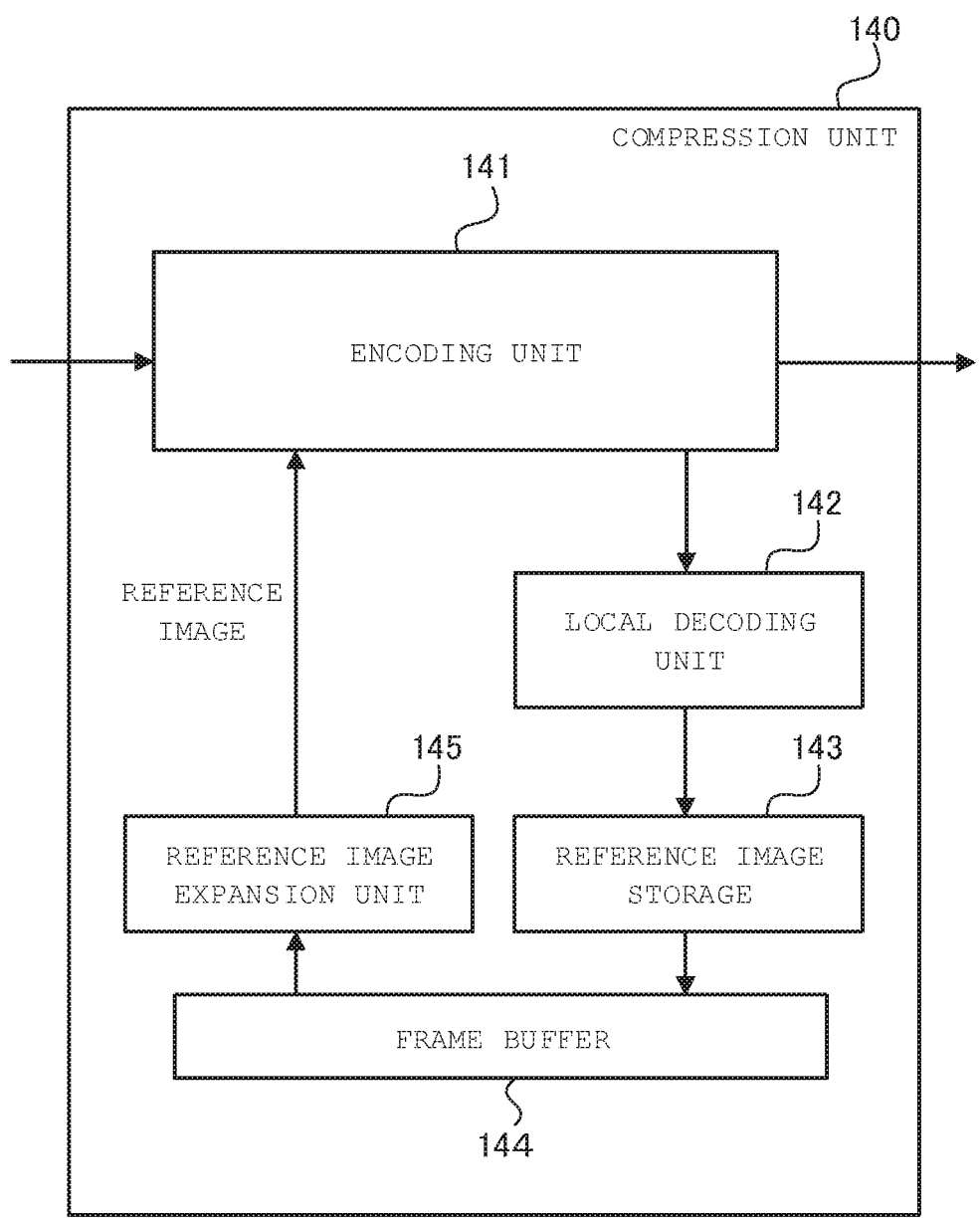
FIG. 2 is a block diagram of a compression unit provided to an encoding device.

FIG. 2 is a block diagram of the compression unit 140. The compression unit 140 includes an encoding unit 141, a local decoding unit 142, a reference image storage 143 (a second reference image storage), a frame buffer 144 (a second frame buffer), and a reference image expansion unit 145 (a second reference image expansion unit).

The encoding unit 141 compresses the input frame based on in-frame prediction and inter frame prediction (e.g. based on a moving picture experts group (MPEG) method).

The local decoding unit 142 generates a local decoded image based on an output from the encoding unit 141. The local decoded image is a simulative reproduction, on the encoding side, of a decoded image to be generated on the decoding side.

The reference image storage 143 compresses the local decoded image and stores it in the frame buffer 144. As a compression method, various known methods may be used. This allows for reducing a storage capacity of the frame buffer 144.

The frame buffer 144 includes a readable and writable storage device such as a static random access memory (SRAM). The frame buffer 144 stores the compressed local decoded image (hereinafter referred to as "compressed reference image"). Note that the frame buffer 144 may be provided outside the compression unit 140.

The reference image expansion unit 145 expands the compressed reference image and transmits the compressed reference image to the encoding unit 141. The expanded image is used as a reference image (second reference image) in the interframe prediction.

Next, a configuration of the decoding device 200 illustrated in FIG. 1 will be described. The decoding device 200 includes a control unit 210, a reception unit 220, a reception memory 230, an output unit 240, and an expansion unit 250.

The control unit 210 includes a processing device such as a processor and controls the respective units of the decoding device 200.

The reception unit 220 is a communication interface for receiving the compressed image data (hereinafter referred to as "received frame") from the encoding device 100.

The reception memory 230 includes a readable and writable storage device such as an SRAM. The reception memory 230 stores the received frame. Note that, since the reception memory 230 stores the compressed image data, a large-capacity buffer is not required.

The expansion unit 250 is a processing device that expands the compressed video data.

The output unit 240 is an output interface for outputting image information to an output device (e.g. liquid crystal display). The output unit 240 outputs a decoded image decoded by the expansion unit 250 to the output device as an output image.

Figure 3:
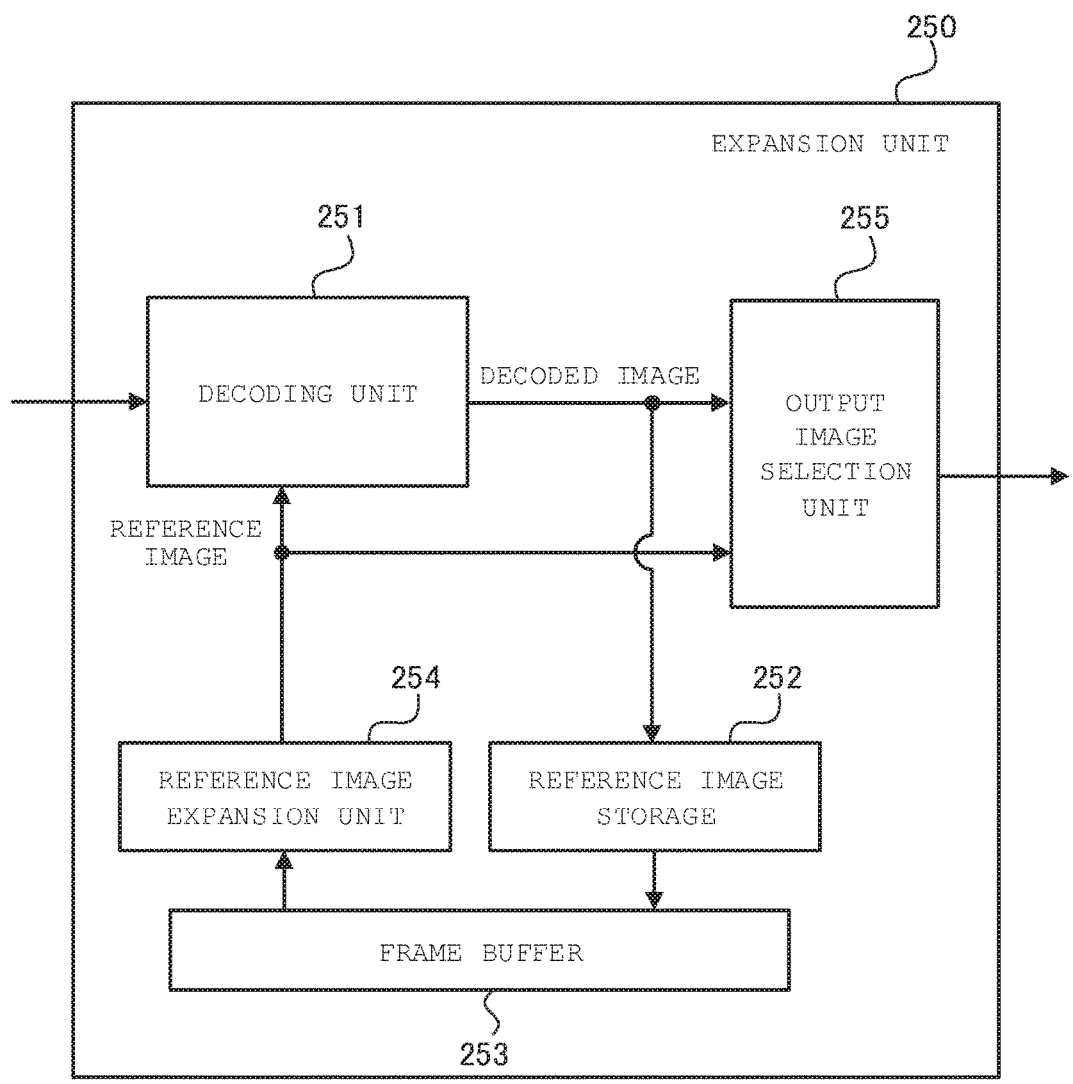
FIG. 3 is a block diagram of an expansion unit provided to a decoding device.

FIG. 3 is a block diagram of the expansion unit 250. The expansion unit 250 includes a decoding unit 251, a reference image storage 252 (a first reference image storage), a frame buffer 253 (a first frame buffer), a reference image expansion unit 254 (a first reference image expansion unit), and an output image selection unit 255.

The decoding unit 251 outputs a decoded image decoded from the received frame stored in the reception memory 230 to the reference image storage 252 and the output image selection unit 255. The decoding unit 251 expands the received frame using an expansion method corresponding to the compression method used by the encoding unit 141.

The reference image storage 252 compresses the decoded image and stores the decoded image in the frame buffer 253. The reference image storage 252 compresses the decoded image using a compression method same as the compression method used by the reference image storage 143. This allows a reference image of the decoding device 200 and that of the encoding device 100 to match with each other even if irreversible compression is used by the reference image storage 143 and reference image storage 252. Note that, in the following description, the decoded image compressed by the reference image storage 252 is referred to as a compressed reference image similarly to the compressed local decoded image.

The frame buffer 253 includes a readable and writable storage device such as an SRAM and stores the compressed reference image. The frame buffer 253 is a ring buffer and thus, when the frame buffer 253 is used by one loop, the compressed reference image is saved by overwriting from a head of the frame buffer 253. A capacity of the frame buffer 253 is smaller than a capacity for two frames of the compressed reference image. An exemplary capacity of the frame buffer 253 is 500 K bytes. This frame capacity can be changed as appropriate according to an image resolution or the like. The frame buffer 253 may be provided outside the compression unit 140.

The reference image expansion unit 254 expands the compressed reference image. The reference image expansion unit 254 expands an image by an expansion method corresponding to the compression method used by the reference image storage 252. The expanded image forms the reference image (first reference image). The reference image expansion unit 145 outputs the expanded reference image to the decoding unit 251 and the output image selection unit 255.

The output image selection unit 255 selects either the reference image or the decoded image. The output image selection unit 255 selects the decoded image when the reception memory 230 does not underflow. The output image selection unit 255 selects the reference image when the reception memory 230 underflows. Underflow refers to, for example, a state where there is no subsequent received frame (or a block) to be decoded in the reception memory 230 or a state where an amount of the received frames (or blocks) is less than or equal to a certain amount. The output image selection unit 255 generates an output image based on the selected reference image and decoded image. When the output image of one frame has been generated, the output image is transmitted to the output unit 240.

Next, operation of the image transmission system 1 will be described. Operation of the image transmission system 1 can be divided into "image compression processing" executed by the encoding device 100 and "image expansion processing" executed by the decoding device 200.

Figure 4:
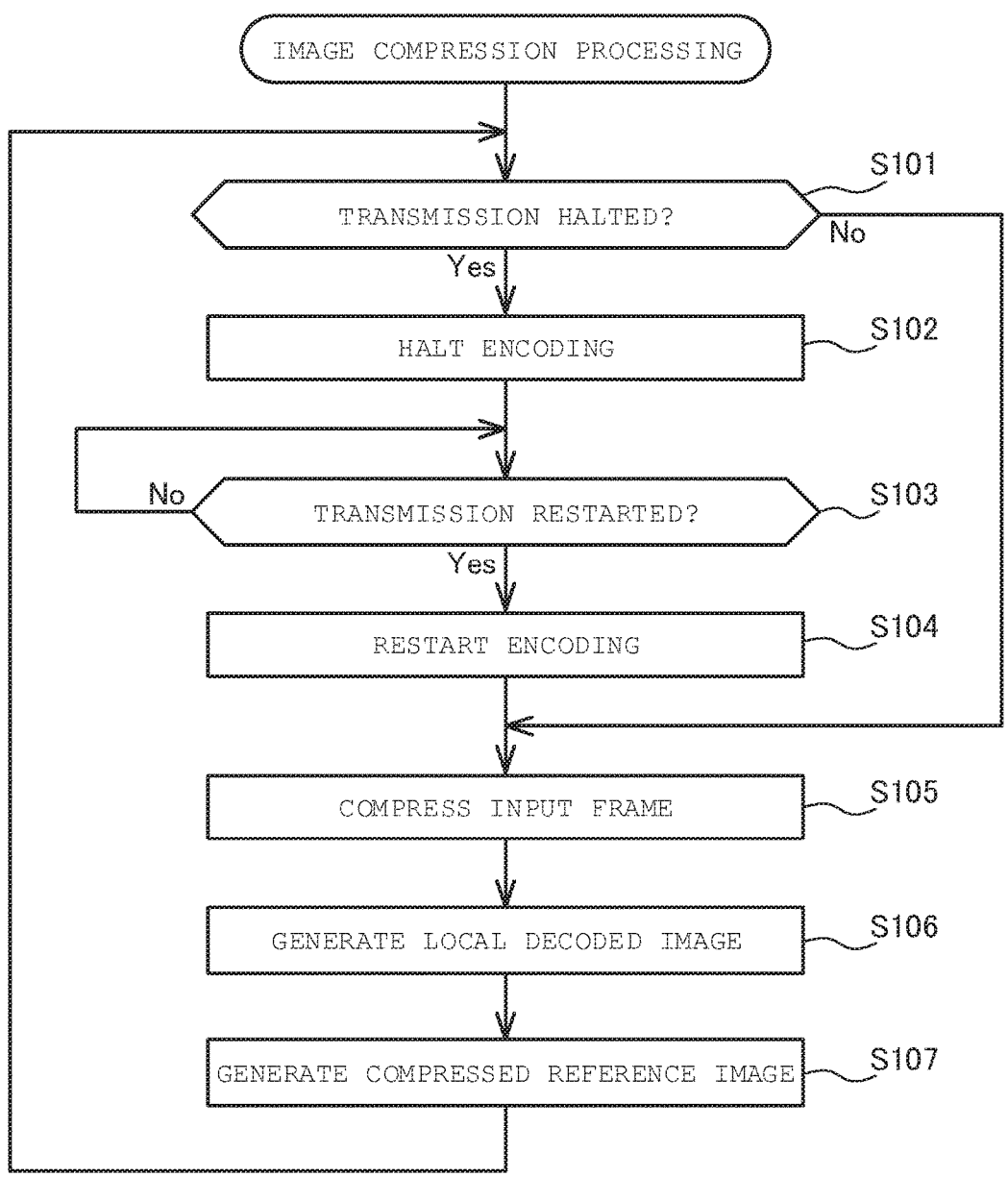
FIG. 4 is a flowchart of image compression processing.

The image compression processing will be described. FIG. 4 is a flowchart of the image compression processing.

The compression unit 140 determines whether the transmission unit 130 has halted transmission (S101). If transmission has not been halted (No in S101), the compression unit 140 proceeds to S105. If transmission has been halted (Yes in S101), the compression unit 140 halts operation of the encoding unit 141 (S102).

Next, the compression unit 140 determines whether the transmission unit 130 has restarted transmission (S103). If transmission has not been restarted (No in S103), the compression unit 140 repeats S103 until transmission is restarted. If transmission has been restarted (Yes in S103), the compression unit 140 restarts operation of the encoding unit 141 (S104).

When transmission is restarted, the encoding unit 141 compresses the input frame (S105). In the present embodiment, the encoding unit 141 generates a P frame and I frame. A P frame (predicted frame) is a frame encoded by forward prediction while an I frame (intra-coded frame) is a frame encoded without using interframe prediction. The I frame may be inserted between the P frames at a certain interval (e.g. every few seconds) or be transmitted only once at a first time after transmission of the image has been started.

Figure 5:
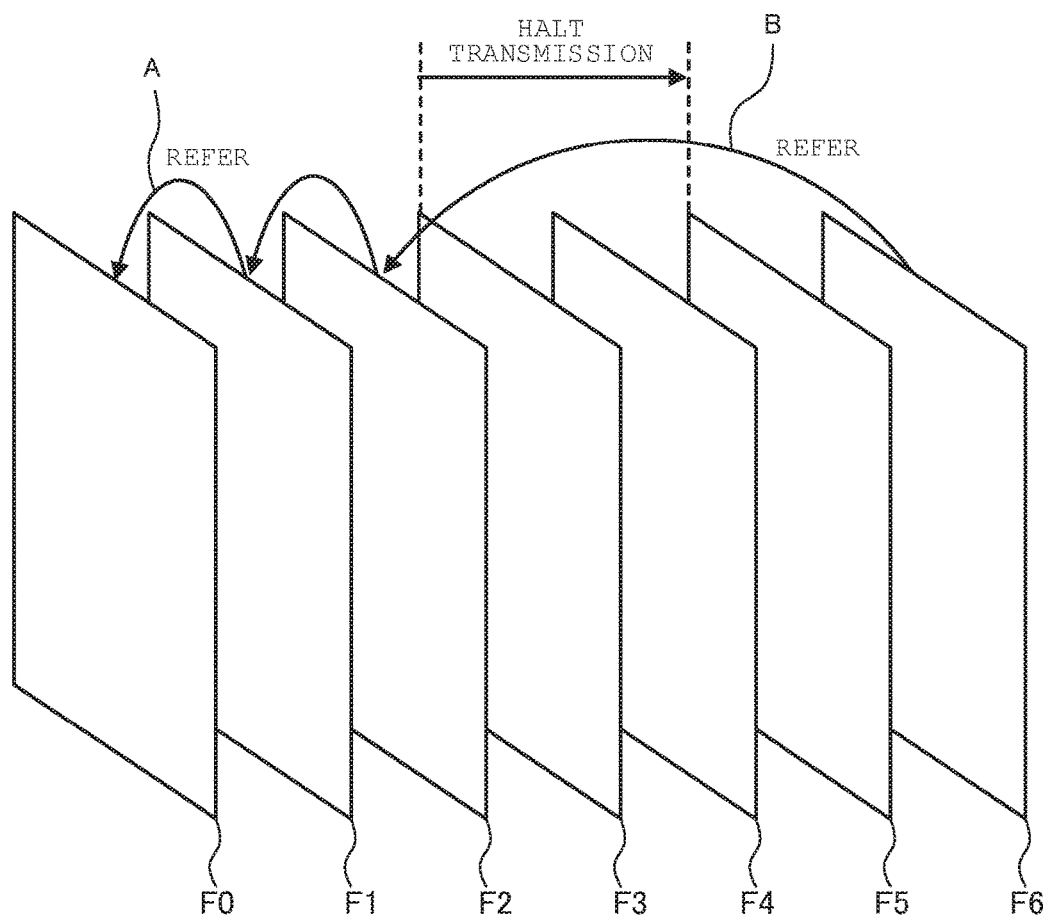
FIG. 5 is a diagram for describing operation of the compression unit.

When the P frame is generated, the encoding unit 141 refers to the input frame preceding by one as the reference image. FIG. 5 is a diagram for describing the reference image of the P frame. When a frame F1 is encoded, the compression unit 140 refers to a frame F0 as the reference image as denoted with A.

Note that, when the transmission unit 130 restarts transmission of the image data, the encoding unit 141 restarts encoding not from a subsequent frame to the frame where transmission has been halted but from the present input frame. For example, if transmission of the image data has been halted for a period from a frame F3 to a frame F5 as illustrated in FIG. 5, the encoding unit 141 restarts encoding not from the frame F3 but from a frame F6. Here, the encoding unit 141 refers not to a preceding input frame but to the latest frame compressed before restart of transmission as the reference image. In the example of FIG. 5, when the frame F6 is encoded, the encoding unit 141 refers not to the frame F5 but to a frame F2 as the reference image. This allows the decoding device 200 to restart decoding instantly without having to wait for reception of the I frame even if transmission of the image data is interrupted.

Thereafter, the local decoding unit 142 generates a local decoded image by decoding the image encoded by the encoding unit 141 (S106). The local decoding unit 142 decodes the image by the same decoding method as that of the decoding unit 251 of the decoding device 200. This allows the reference image of the encoding device 100 and that of the decoding device 200 to be exactly the same. Therefore, no errors accumulate due to continued decoding.

Next, the reference image storage 143 generates a compressed reference image by compressing the local decoded image (S107). The reference image storage 143 stores the compressed reference image in the frame buffer 144. When storing is completed, the compression unit 140 returns to S101. The compression unit 140 repeats S101 to S107 until the control unit 110 commands to halt the image compression processing.

Figure 6:
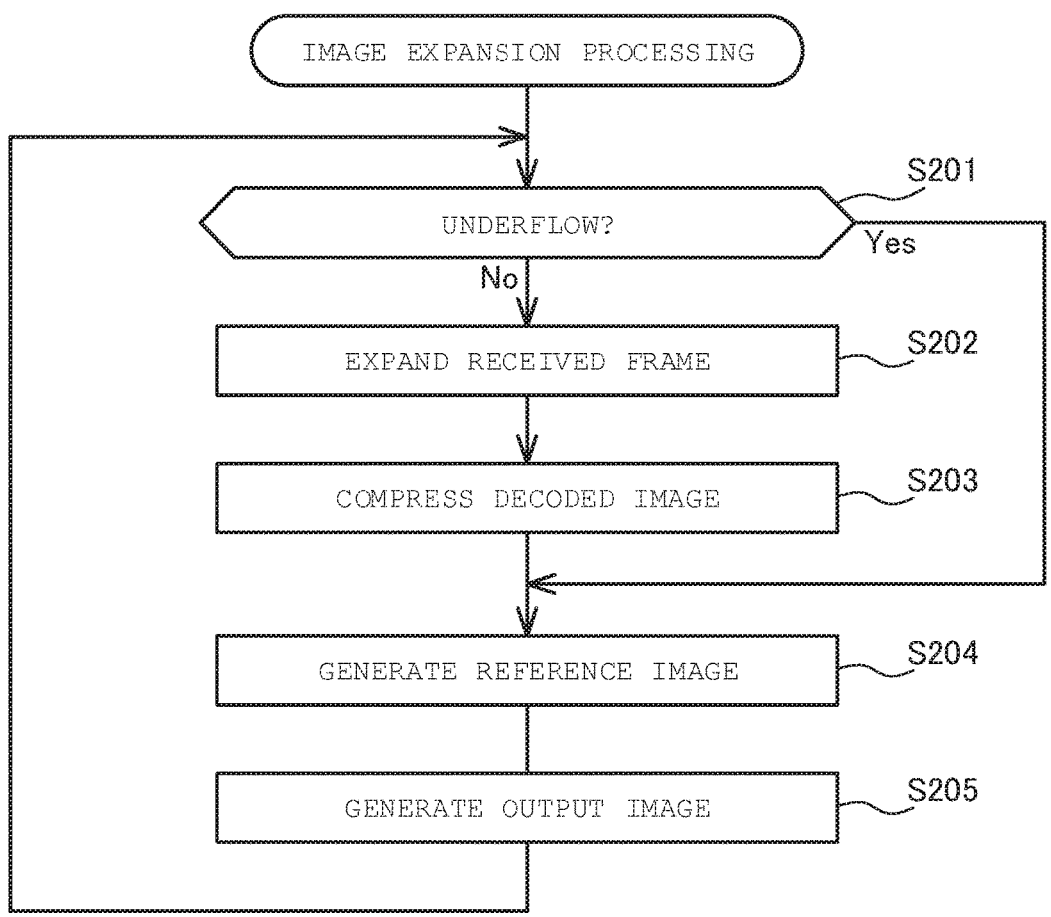
FIG. 6 is a flowchart of image expansion processing.

Next, the image expansion processing will be described. FIG. 6 is a flowchart of the image expansion processing.

The expansion unit 250 determines whether the reception memory 230 underflows (S201). The method of determining underflow is not limited to a specific one. For example, the expansion unit 250 may determine occurrence of underflow when the reception memory 230 does not send data to be decoded next or when an amount of data stored in the reception memory 230 is less than or equal to a certain amount. When the reception memory 230 underflows (Yes in S201), the expansion unit 250 halts operation of the decoding unit 251 and proceeds to S204. When the reception memory does not underflow (No in S201), the expansion unit 250 proceeds to S202.

The decoding unit 251 decodes the received frame and generates the decoded image (S202). Note that, when interframe prediction is used, the decoding unit 251 refers to the received frame preceding by one as the reference image. If transmission of the image data is interrupted, the decoding unit 251 refers to the latest frame received before restart of transmission of the image data as the reference image. The decoding unit 251 transmits the decoded image to the output image selection unit 255 and the reference image storage 252.

Figure 7:
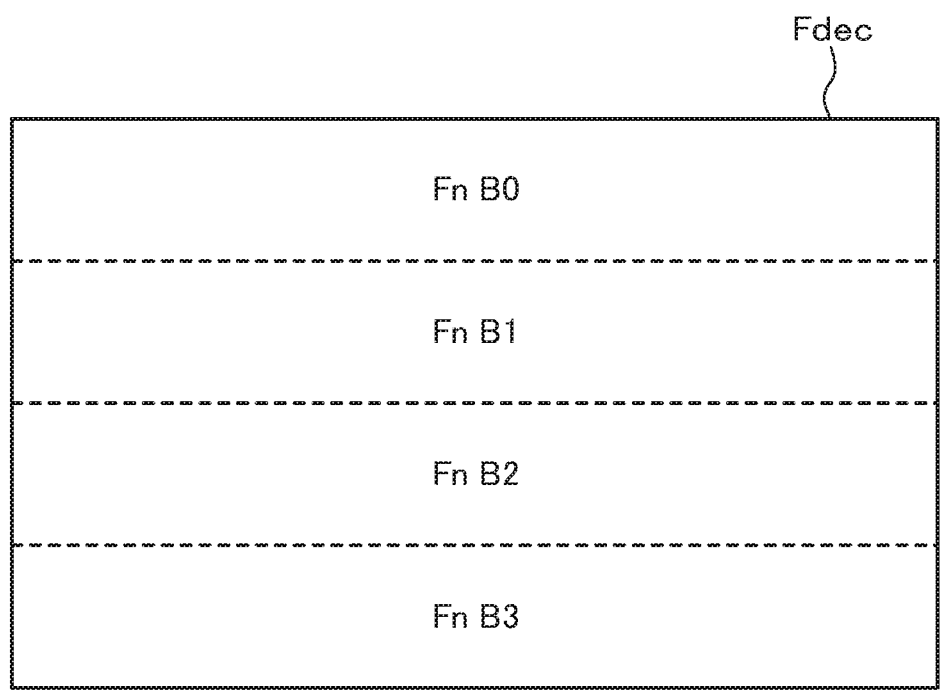
FIG. 7 is a diagram illustrating a decoded image divided by a reference image storage.

The reference image storage 252 generates a compressed reference image by compressing the decoded image (S203). In the present embodiment, the decoded image is divided into a plurality of blocks and thereby compressing the decoded image by each block. FIG. 7 is a diagram illustrating an example of a divided decoded image Fn. In the description below, it is assumed that the decoded image is divided into four equal parts in a horizontal direction. The divided blocks are referred to as processing blocks B0 to B3. The processing block may be different from a block as a unit of encoding by the encoding unit 141. The reference image storage 252 stores the compressed processing block (hereinafter referred to as "compressed block") in the frame buffer 253.

The reference image expansion unit 254 reads the compressed block from the frame buffer 253. Thereafter, the reference image expansion unit 254 expands the compressed block and outputs the block to the decoding unit 251 and the output image selection unit 255 as the reference image (S204).

The output image selection unit 255 generates an output image based on the decoded image or reference image (S205). For example, the output image selection unit 255 generates the output image based on the decoded image when underflow does not occur and generates the output image based on the reference image when underflow occurs.

Figure 8:
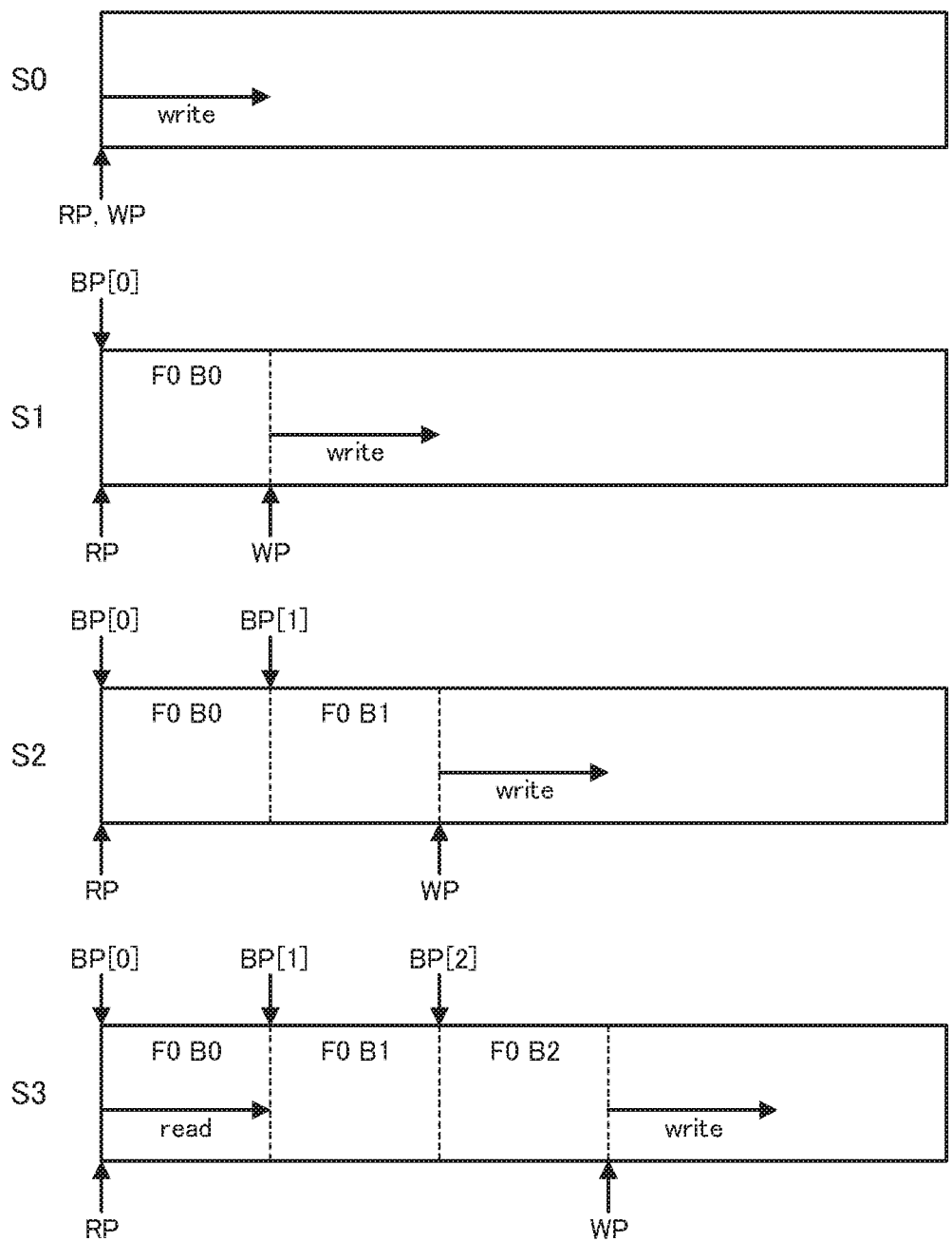
FIG. 8 is an example of reading and writing by a frame buffer when a reception memory does not underflow.

Operations of S203 to S205 will be described specifically below. FIG. 8 is an example of reading and writing of the frame buffer 253. In FIG. 8, WP denotes a write pointer and RP denotes a read pointer. FnBi (where n and i are integers) denotes a compressed block Bi in a frame Fn (hereinafter referred to as "compressed block FnBi"). Before operation of the compression unit 140 is initiated, a write pointer WP and a read pointer RP are both initialized to zero.

The reference image storage 252 writes the compressed block sequentially to the frame buffer 253 from a position indicated by the write pointer WP. S0 in FIG. 8 illustrates a state where a compressed block F0B0 is being written. S1 illustrates a state where a compressed block F0B1 is being written. Similarly, S2 and S3 illustrate the states where compressed blocks F0B2 and F0B3, respectively, are being written.

Note that the size of the compressed block may not be constant. As more value on image quality is placed, the size of the compressed block may include a variation width of a certain degree. In this case, the reference image storage 252 stores a write starting position and a size of the block in a RAM (not shown) each time writing of each compressed block is completed. The RAM may be a flip-flop or may be an SRAM. Alternatively, the reference image storage 252 may store the write starting position and the size of the block in the frame buffer 253. In the example of FIG. 8, a write starting position of a compressed block Bi is denoted as BP[i].

The reference image expansion unit 254 reads the compressed block sequentially from a position indicated by the read pointer RP. S3 in FIG. 8 illustrates a state where the block B0 in the frame F0 is being read.

Figure 9:
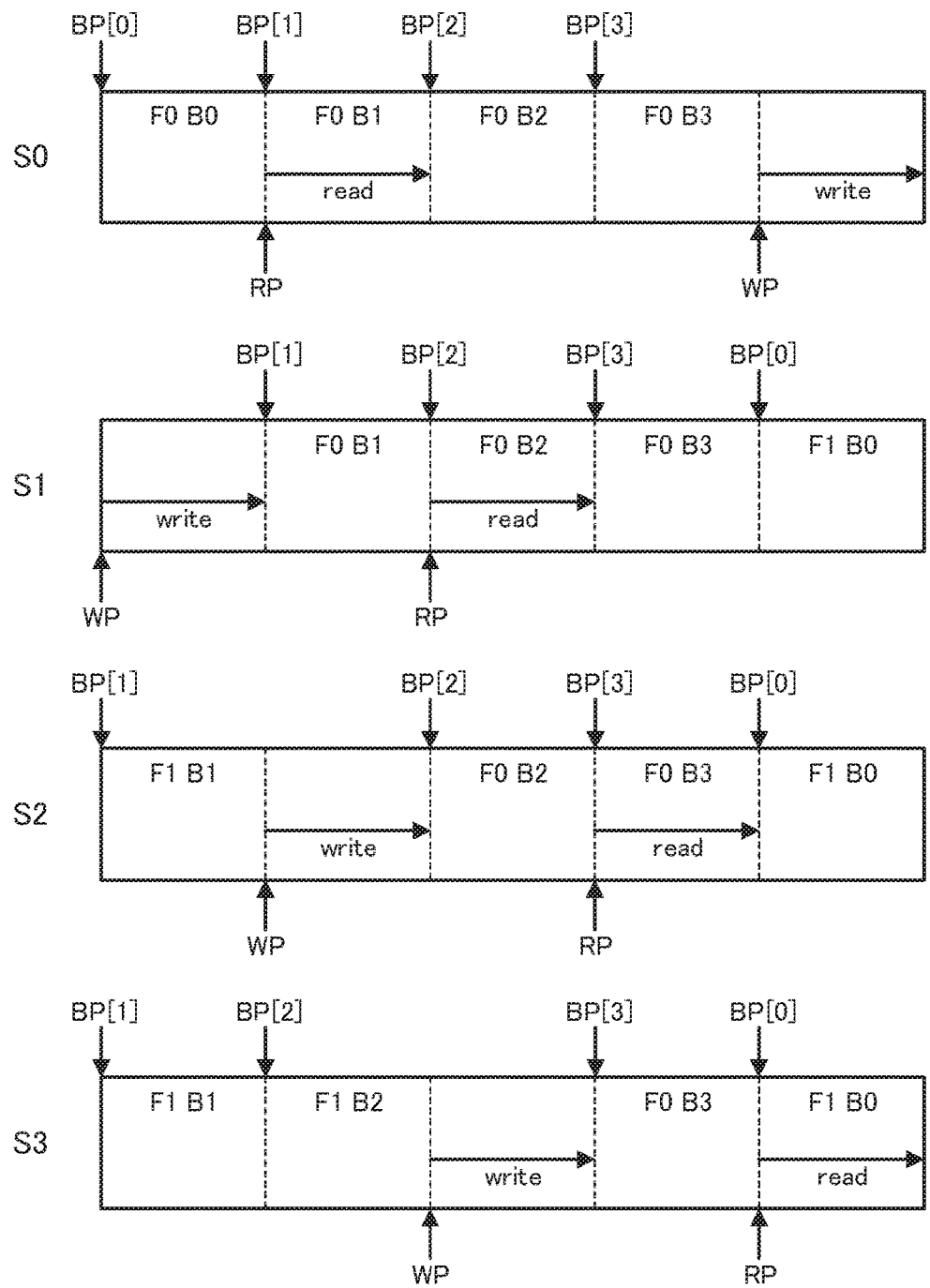
FIG. 9 is an example of reading and writing by the frame buffer when the reception memory does not underflow.

FIG. 9 illustrates that a compressed block of the frame F1 is written to the frame buffer 253 subsequently to the frame F0. The frame buffer 253 has a capacity for compressed blocks of one frame and one block. The frame buffer 253 shall be able to maintain compressed blocks of one frame at all times.

Figure 10:
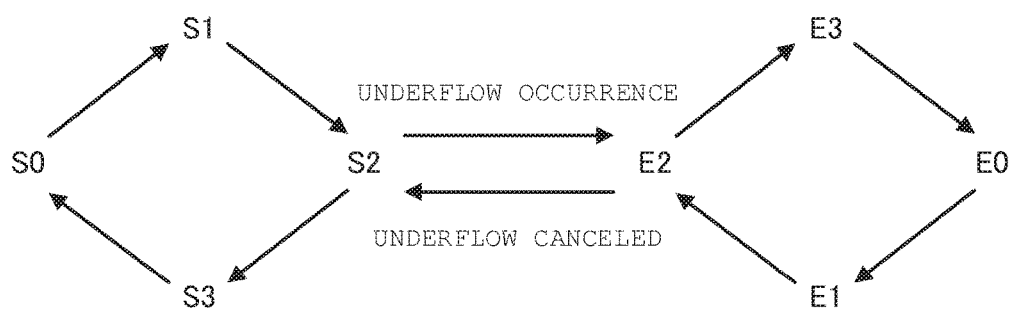
FIG. 10 is a state transition diagram of the reference image storage and a reference image expansion unit.

FIG. 10 is a state transition diagram of the reference image storage 252 and reference image expansion unit 254. The reference image storage 252 and reference image expansion unit 254 transit among S0 to S3 while the reception memory 230 does not underflow. On the other hand, the reference image storage 252 and reference image expansion unit 254 transit from a state S to state E, where E0 to E3 are repeated, when the reception memory 230 underflows. Note that FIG. 10 illustrates a state of transition to E2 when underflow has occurred in S2.

In the state S, the reference image expansion unit 254 reads the compressed block from the frame buffer 253 such that the read pointer RP does not pass the write pointer WP. The reference image expansion unit 254 then expands the compressed block having been read and outputs the expanded block to the decoding unit 251. The decoding unit 251 generates the decoded image while referring to the block acquired from the reference image expansion unit 254 as the reference image. The output image selection unit 255 outputs the decoded image to the output unit 240 as the output image.

There are cases where data transmission or reception is interrupted for a while due to fluctuation of a transmission band or the like. When the decoding unit 251 continues decoding of the received frames in such a state, the reception memory 230 underflows. When the reception memory 230 underflows, the expansion unit 250 halts operations of the decoding unit 251 and reference image storage 252 in addition to changing operations of the reference image expansion unit 254 and output image selection unit 255.

Figure 11:
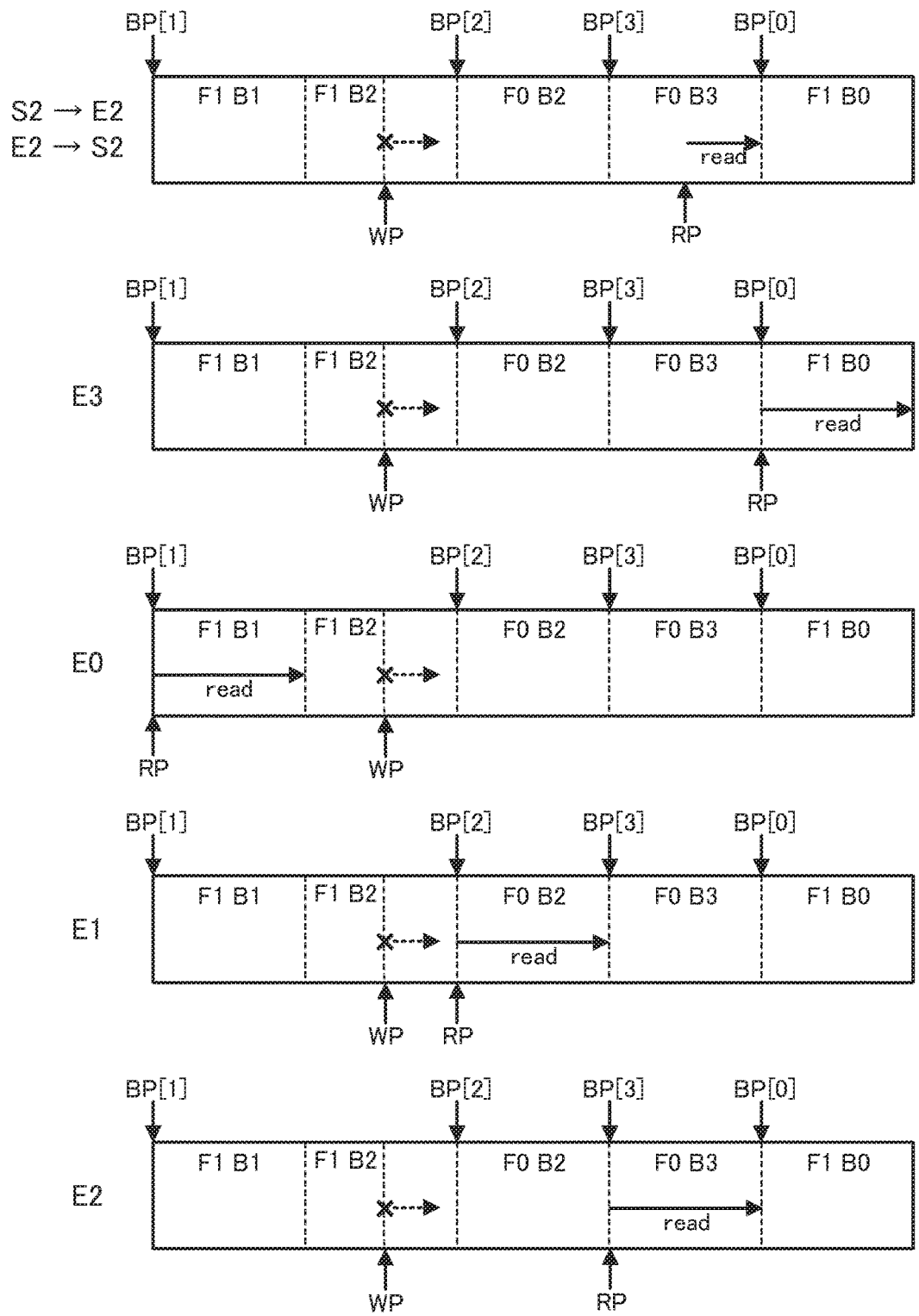
FIG. 11 is a diagram illustrating a status of the frame buffer after occurrence of underflow.

FIG. 11 illustrates the frame buffer 253 after occurrence of underflow. In FIG. 11, underflow has occurred in S2 and thus the write pointer WP stops halfway in a compressed block B2 of the frame F1. The reference image expansion unit 254 continues expanding the compressed block without halting the operation even after the underflow occurrence. The frame buffer 253 transits in the order of E3, E0, E1, E2, E3, etc.

When transited to the state E, the reference image expansion unit 254 repeats reading blocks of one frame until underflow is canceled. That is, when the read pointer RP reaches the head of a block where the write pointer WP is stopped at, the reference image expansion unit 254 skips that block and reads a next block. In the example of FIG. 11, the reference image expansion unit 254 skips a compressed block F1B2 after completing read of a compressed block F1B1 (state E0) and reads a compressed block F0B2 (state E1).

Figure 12:
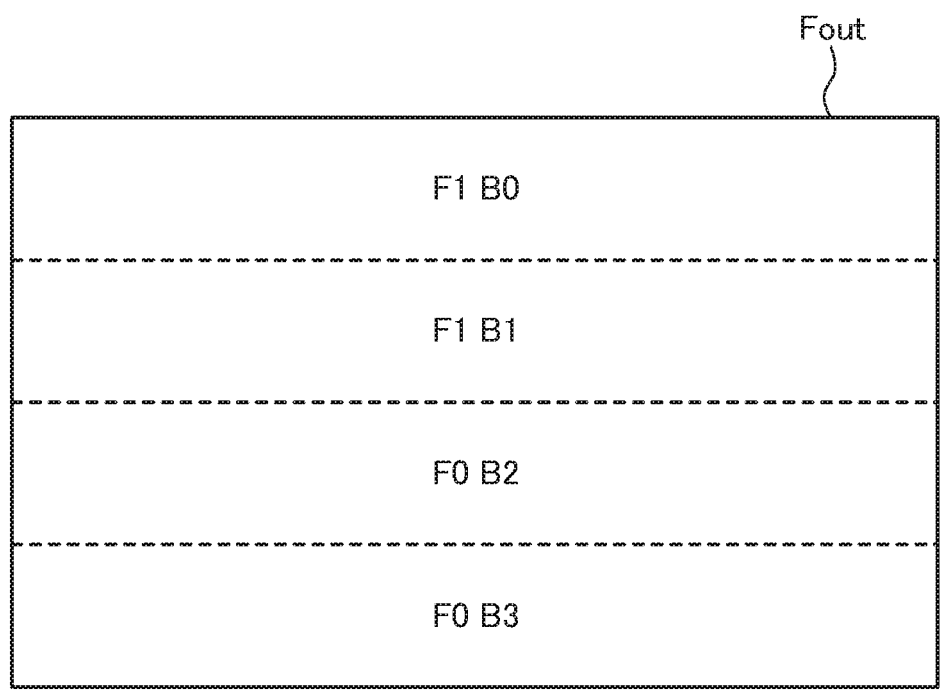
FIG. 12 is a diagram illustrating an exemplary output image.

The output image selection unit 255 selects the reference image from the reference image expansion unit 254. The output image selection unit 255 generates a composite image based on the selected reference image. The composite image is a composition of a decoded part of the frame where decoding has been interrupted and, from among blocks in the preceding frame stored in the frame buffer 253, a block corresponding an undecoded part. FIG. 12 is a composite image generated by the operation of E0 to E3 in FIG. 11. A composite image Fout in FIG. 12 includes blocks B0 and B1 of the frame F1 where decoding has been interrupted and blocks B2 and B3 of the preceding frame F0.

Read of the compressed block is repeated until the read pointer RP reaches the same position as that where underflow has occurred. If underflow is canceled when the read pointer RP reaches the position where the underflow has occurred, the expansion unit 250 restarts operations of the decoding unit 251 and reference image storage 252. Thereafter, the expansion unit 250 transits from E2 to S2. If the underflow has not been canceled, the expansion unit 250 continues operation of E3 to E2.

The decoding device 200 according to the embodiment includes the output image selection unit 255 in a subsequent stage to the decoding unit 251. The output image selection unit 255 selects, as the output image, a reference image output from the reference image expansion unit 254 and not the decoded image output from the decoding unit 251 when the reception memory 230 underflows. Therefore, even if a capacity of the buffer in the preceding stage or subsequent stage to the decoding unit 251 is small, the output image has little artifact. The decoding device 200 allows for reducing the capacity of the buffer, thereby implementing low power consumption, low delay, and low cost.

The decoding device 200 is configured to compress and store, in the frame buffer 253, the reference image. Therefore, the frame buffer 253 with a capacity of around 500 K bytes can sufficiently store full high definition (FHD) data of one frame and one block. Since the capacity can be reduced, the frame buffer 253 may be SRAM and not DRAM. Therefore, the decoding device 200 operates without a DRAM module, thereby implementing low power consumption and low cost.

Moreover, the reference image storage 252 divides the decoded image in a horizontal direction. As a result, an image output from the output image selection unit 255 upon underflow occurrence may include different frames in upper and lower segments. This image gives an impression to a user as if the image output stopped halfway of renewing the image from the top. Thus, the decoding device 200 allows the user to know without discomfort that reception of the image has stopped.

(Second Embodiment)

In H.264, encoding efficiency is enhanced by using a result of expanding the preceding block upon encoding. Also in the present embodiment, encoding efficiency can be enhanced when a result of expanding a preceding block is used upon compression of a block by the reference image storage 252. However, the decoding device 200 of the first embodiment controls the reference image storage 252 and reference image expansion unit 254 such that state transition upon underflow occurrence is as illustrated in FIG. 11. This may result in a case where usage of the preceding block by the reference image storage 252 for encoding prevents the reference image expansion unit 254 from expanding a compressed block.

For example, the reference image expansion unit 254 expands a compressed block in the order illustrated in FIG. 11 (E2, E3, E0, and E1). The reference image expansion unit 254 is required to refer to a compressed block F0B1 upon expanding a compressed block F0B2 (i.e. in E1). In E1, however, the compressed block F0B1 is not in the frame buffer 253. Therefore, in the example of FIG. 11, the reference image expansion unit 254 cannot expand the compressed block F0B2. In the second embodiment, the reference image expansion unit 254 is made capable of expanding a compressed block even upon underflow occurrence.

Figure 13:
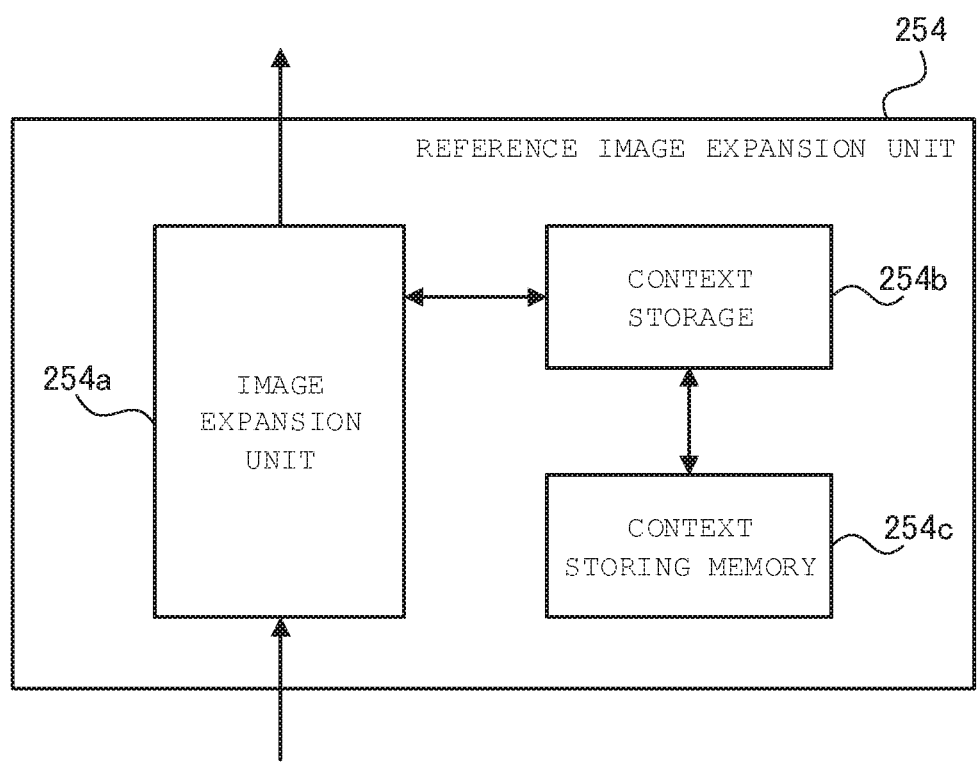
FIG. 13 is a block diagram of a reference image expansion unit according to a second embodiment.

An image transmission system 1 according to the second embodiment will be described below. Note that configurations other than that of a reference image expansion unit 254 are same and thus descriptions thereon are omitted. FIG. 13 is a block diagram of the reference image expansion unit 254. The reference image expansion unit 254 includes an image expansion unit 254a, a context storage 254b, and a context storing memory 254c.

The image expansion unit 254a expands a compressed block in the frame buffer 253. The context storage 254b stores a block expanded by the image expansion unit 254a to the context storing memory 254c. The context storing memory 254c stores the block sent from the context storage 254b. The context storage 254b includes a readable and writable storage device such as an SRAM. A capacity of the context storage 254b is smaller than that of the frame buffer 253. For example, the capacity of the context storage 254b may be for two blocks of expanded blocks.

Next, operation of the reference image expansion unit 254 will be described. The context storage 254b stores the block expanded by the image expansion unit 254a to the context storing memory 254c when there is no underflow occurrence. When underflow occurs, the context storage 254b sends the expanded block stored in the context storing memory 254c to the image expansion unit 254a upon a request from the image expansion unit 254a. For example, when the image expansion unit 254a expands the compressed block F0B2 (E1 in FIG. 11), the context storage 254b retrieves the expanded block F0B1 from the context storing memory 254c and sends the expanded block F0B1 to the image expansion unit 254a. Thereafter, the image expansion unit 254a refers to the expanded block sent from the context storage 254b and thereby expands a compressed block.

According to the present embodiment, the reference image expansion unit 254 includes the context storage 254b and context storing memory 254c therein. Therefore, the reference image expansion unit 254 can continue expanding the compressed block even upon underflow occurrence. As a result, the decoding device 200 can continue image output even upon underflow occurrence while encoding efficiency of the reference image is maintained.

(Third Embodiment)

The decoding device 200 according to the second embodiment is added with the context storage 254b, which may result in reduced throughput of the reference image expansion unit 254. For example, when the reference image expansion unit 254 recovers to a normal state after underflow is canceled, the reference image expansion unit 254 may take time for context recovery processing. The context recovery processing is processing for returning to a normal state (a state without underflow occurrence) and includes processing such as halting the context storage 254b or causing mode transitions to the image expansion unit 254a. When the context recovery processing takes time, an output image from the decoding device 200 shows artificiality. In the third embodiment, even when the context recovery processing by the reference image expansion unit 254 takes time, the decoding device 200 is made capable of outputting an image without discomfort.

Figure 14:
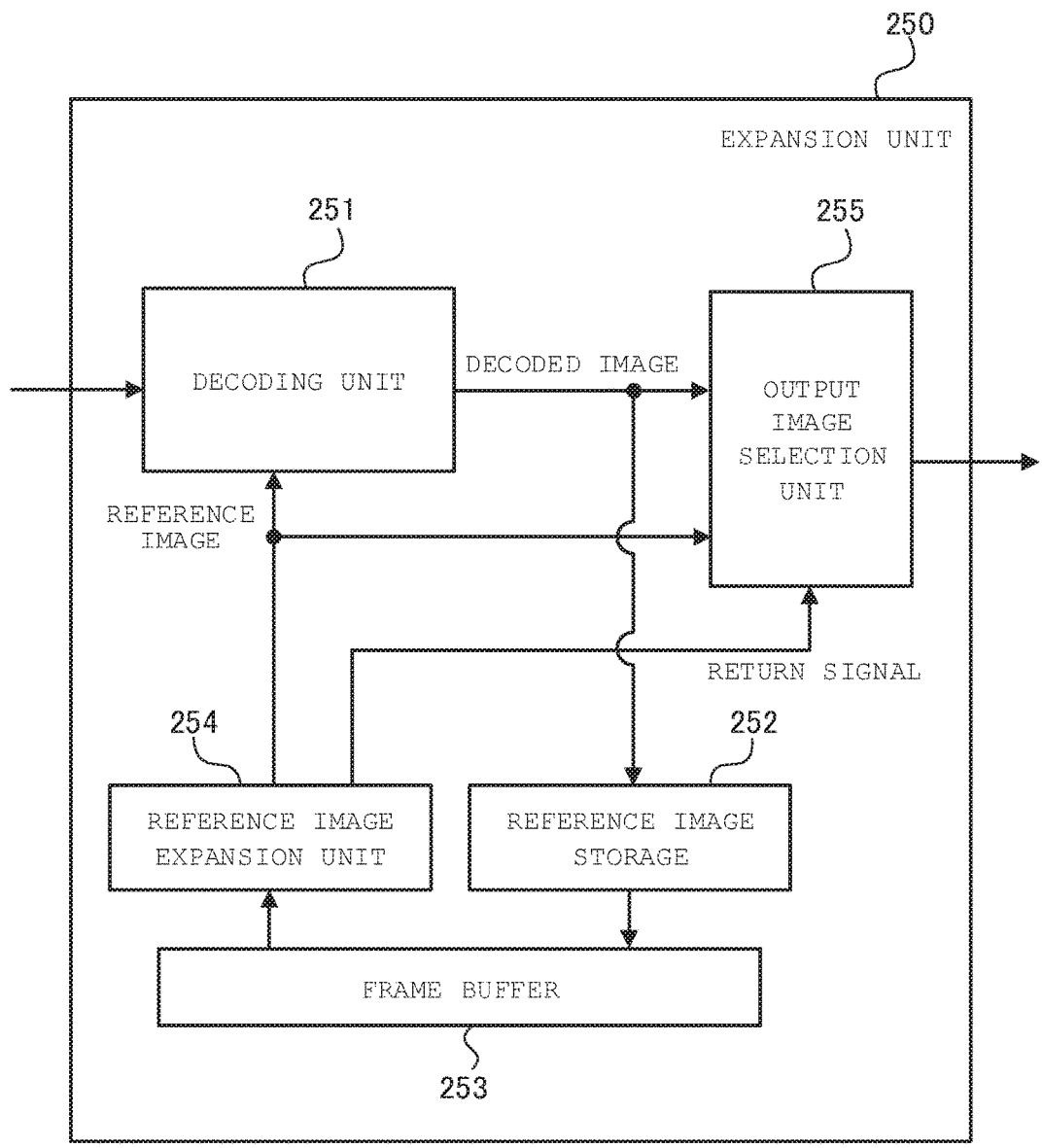
FIG. 14 is a block diagram of an expansion unit according to a third embodiment.

An image transmission system 1 according to the third embodiment will be described below. Note that configurations other than that of an expansion unit 250 are the same as those of the first embodiment and thus descriptions thereon are omitted. FIG. 14 is a block diagram of the expansion unit 250. The expansion unit 250 includes a decoding unit 251, a reference image storage 252, a frame buffer 253, a reference image expansion unit 254, and an output image selection unit 255.

Configurations of the decoding unit 251, reference image storage 252, and frame buffer 253 are same as those of the first embodiment. A configuration of the reference image expansion unit 254 is the same as the one in FIG. 13. However, there is a difference that the reference image expansion unit 254 is capable of outputting a return signal to the output image selection unit 255. The return signal notifies the output image selection unit 255 that the context recovery processing has been completed.

The output image selection unit 255 has a configuration same as that of the output image selection unit 255 of the first embodiment. However, the output image selection unit 255 of the third embodiment switches an output image from the reference image to the decoded image when underflow is canceled and when receiving the return signal from the reference image expansion unit 254. The output image selection unit 255 selects, as the output image, the reference image output from the reference image expansion unit 254 until receiving the return signal even when underflow is canceled.

Note that an image output from the output image selection unit 255 is not necessarily the reference image during execution of the context recovery processing, namely, a period after cancellation of underflow to reception of the return signal by the output image selection unit 255. For example, if the decoding unit 251 has a reference image buffer therein, the output image selection unit 255 may use an image stored in the reference image buffer as an output image.

According to the present embodiment, even when the context recovery processing takes time, the decoding device 200 can output an image without giving discomfort to a user.

(Fourth Embodiment)

Most of data to be stored in the context storage 254b is pixel information. Data other than the pixel information (e.g. control data) is small in quantity compared to the pixel information. If the decoding unit 251 has a reference image buffer therein, the pixel information remains in the reference image buffer. Leveraging this allows for reducing a capacity of the context storing memory 254c. In the fourth embodiment, a capacity of the context storing memory 254c is reduced by using data in the reference image buffer.

Figure 15:
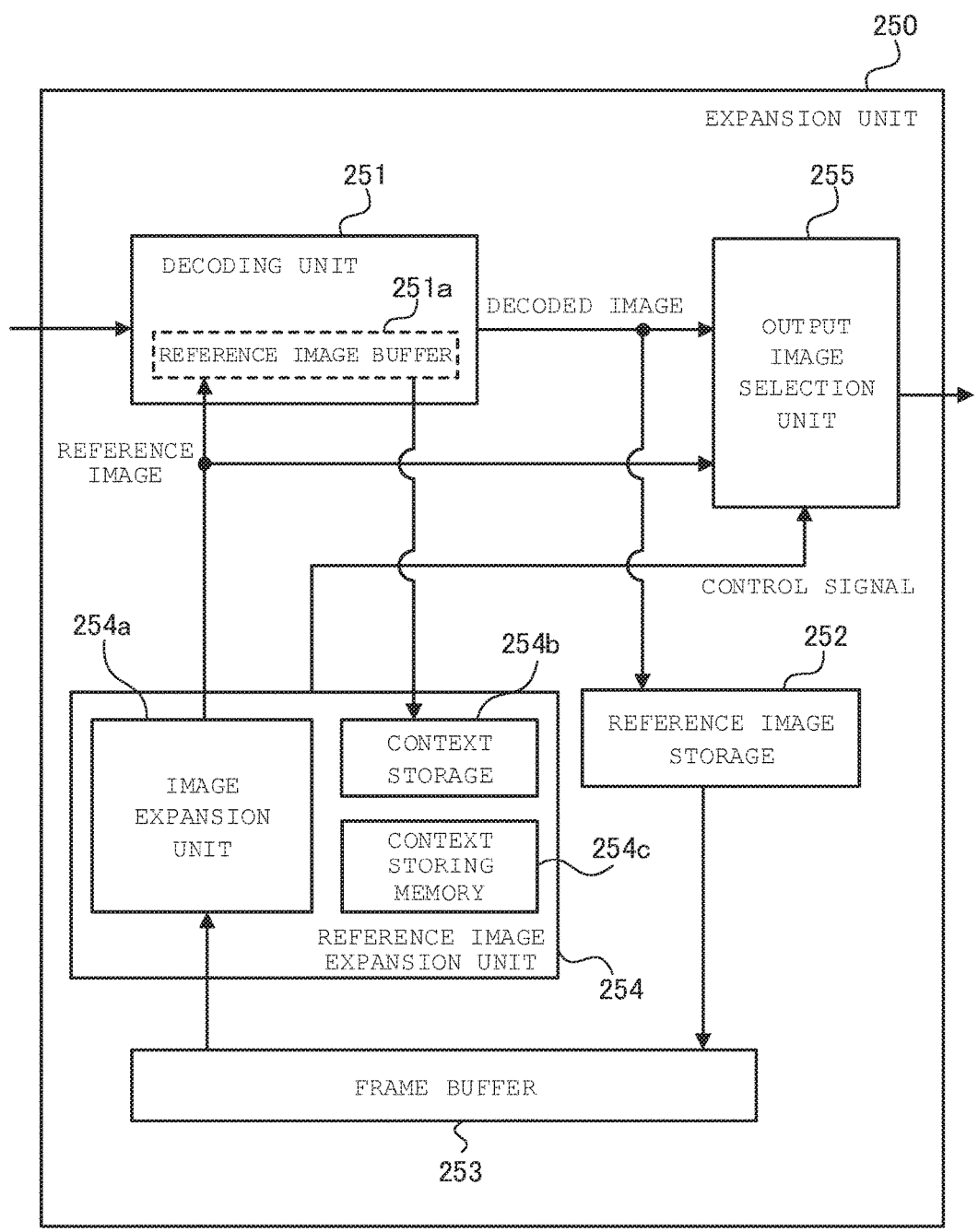
FIG. 15 is a block diagram of an expansion unit according to a fourth embodiment.

An image transmission system 1 according to the fourth embodiment will be described below. Note that configurations other than that of an expansion unit 250 are the same as those of the first embodiment and thus descriptions thereon are omitted. FIG. 15 is a block diagram of the expansion unit 250. The expansion unit 250 includes a decoding unit 251, a reference image storage 252, a frame buffer 253, a reference image expansion unit 254, and an output image selection unit 255.

The decoding unit 251 of the fourth embodiment includes a reference image buffer 251a. A block expanded by the reference image expansion unit 254 is once stored in the reference image buffer 251a.

Although a configuration of the reference image expansion unit 254 is the same as that of the third embodiment, the context storage 254b can acquire data not only from the context storing memory 254c but also from the reference image buffer 251a. Other configurations are the same as those of the expansion unit 250 of the third embodiment.

Operation of the reference image expansion unit 254 will be described. When underflow occurs, the context storage 254b sends the pixel information stored in the reference image buffer 251a to the image expansion unit 254a upon a request from the image expansion unit 254a. The context storage 254b sends the data other than the pixel information stored in the context storing memory 254c to the image expansion unit 254a. Thereafter, the image expansion unit 254a expands the compressed block using the data sent from the context storage 254b.

According to the present embodiment, a capacity of the context storing memory 254c can be reduced since the context storage 254b is configured to allow for acquisition of pixel information from the reference image buffer 251a in the decoding unit 251.

Note that, when employing the configuration of the fourth embodiment, reading for context recovery processing by the context storage 254b and reading for decoded image output by the decoding unit 251 upon context recovery processing may concurrently occur in the reference image buffer 251a. Occurrence of concurrent reading lowers throughput of the reference image expansion unit 254. However, if the reference image buffer 251a includes an SRAM having a plurality of banks, the context storage 254b is only required to read, for context recovery, from a bank where no reading for decoded image output is performed. This allows for avoiding competing reading from the SRAM, thereby enhancing throughput of the decoding unit 251 and reference image expansion unit 254.

Note that the present embodiment is one example and thus various modifications or applications may be applied. For example, the expansion unit 250 may be configured such that the decoding unit 251, reference image storage 252, reference image expansion unit 254, and output image selection unit 255 operate in a pipeline manner. In this case, the reference image storage 252 selects a leading compressed block in consideration of a pipeline delay upon underflow occurrence.

While the capacity of the frame buffer 253 is one frame and one block in the present embodiment, the capacity of the frame buffer 253 may be larger than that for one frame and one block. Output of one frame is repeated from a starting point of the read pointer RP. That is, when read of one frame is completed, reading is repeated from the starting point while skipping a remaining block.

While the reference image storage 252 divides the decoded image into four processing blocks in the present embodiment, the number of blocks per image is not limited to four. The number of blocks per image may be smaller or greater than four. Note that the capacity of the frame buffer 253 has to be at least for one frame and one block in order to implement the decoding device 200 of the present embodiment. Increasing the number of blocks per image reduces a capacity required for one block, thereby reducing the capacity of the frame buffer 253.

Furthermore, in the present embodiment, the output image selection unit 255 acquires a block of a previous frame stored in the frame buffer 253 via the reference image expansion unit 254. However, a part of expansion result of the reference image is retained in the inner buffer in the decoding unit 251 upon underflow occurrence. For example, the part of expansion result is retained in the inner buffer in the decoding unit 251 for retaining pixels within a searching range of motion search. Therefore, the output image selection unit 255 may be allowed to acquire the block from this inner buffer. In this case, a total capacity of both the frame buffer 253 and the inner buffer in the decoding unit 251 is only required to accommodate one frame and a block. Therefore, the capacity of the frame buffer 253 may be reduced.

Moreover, in the present embodiment, the reference image storage 252 stores the processing block in the frame buffer 253 in a compressed format. However, the reference image storage 252 is not necessarily required to store the processing block in the frame buffer 253 in a compressed format. In this case, the decoding unit 251 and the output image selection unit 255 acquire the processing block directly from the frame buffer 253.

Note that the decoding device 200 may be a complete product such as a TV, player, recorder, personal computer, fixed telephone set, portable telephone set, smartphone, tablet terminal, personal digital assistant (PDA), or a gaming machine. Alternatively, the decoding device 200 may be a component such as a semiconductor chip or semiconductor substrate.

The encoding device 100 and the decoding device 200 according to the present embodiment may be implemented by a dedicated computer system or by a normal computer system. For example, the encoding device 100 and the decoding device 200 may be configured by storing a program for executing the aforementioned operation in a computer-readable storage medium such as an optical disc, semiconductor memory, magnetic tape, or flexible disc for distribution and allowing a computer to install the program for execution of the aforementioned processing thereon. Alternatively, the program may be stored in a disc device included in a server device on a network such as the Internet to allow a computer to download, etc. the program therefrom. Alternatively, the aforementioned function may be implemented by cooperation between an operating system (OS) and an application software. In this case, a part other than that in the OS may be stored in a medium for distribution or stored in a server device to allow a computer to download, etc. therefrom.

The embodiments according to the present invention have been described above, but the embodiments are demonstrated by way of example and do not intend to limit the scope of the invention. The novel embodiments may be accomplished in various forms and may be variously omitted, replaced and changed without departing from the scope of the invention. The embodiments and their variants are encompassed in the scope or spirit of the invention, and are encompassed in the invention described in Claims and the range of its equivalents.

What is claimed is:

1. A decoding device comprising:
a reception memory configured to store received image;
a frame buffer configured to store a reference image;
a decoding processor configured to decode the received image based on the reference image and to generate a decoded image;
a reference image storage configured to store the decoded image in the frame buffer as the reference image; and
an output image selection processor configured to select the reference image stored in the flame buffer when the reception memory underflows and to select the decoded image when the reception memory does not underflow,
wherein the reference image stored in the frame buffer is the compressed reference image where the decoded image is compressed,
the decoding processor further comprising a reference image expansion processor configured to output the reference image having been expanded from the compressed reference image to the decoding processor and the output image selection processor,
the reference image storage compresses the decoded image by each block,
the output image selection processor outputs a composite image formed by a decoded part of the received image and the reference image, corresponding to an undecoded part, stored in the frame buffer when decoding by the decoding processor is interrupted halfway in a frame due to the underflow, and
a capacity of the frame buffer is smaller than a capacity for two frames of the compressed reference image to store compressed pixel blocks of one frame and at least one pixel block within a limited searching range of motion search.

2. The decoding device according to claim 1, wherein the output image selection processor repeats outputting the composite image until the underflow is canceled.

3. The decoding device according to claim 1, wherein the reference image storage stores the decoded image divided into a plurality of blocks in the frame buffer.

4. The decoding device according to claim 1, wherein the frame buffer is an SRAM.

5. The decoding device according to claim 1, wherein the reference image storage stores the decoded image in the frame buffer by each block, and
the output image selection processor outputs a composite image where an undecoded part of a frame output from the decoding processor is interpolated from the block stored in the frame buffer when decoding by the decoding processor is interrupted halfway in the frame.

6. The decoding device according to claim 1, wherein the reference image storage stores the decoded image, compressed by each block, in the frame buffer, and
the output image selection processor outputs a composite image formed by a decoded part of a frame where decoding has been interrupted and, from among the blocks in a preceding frame stored in the frame buffer, the block corresponding an undecoded part when decoding by the decoding processor is interrupted halfway in the frame.

7. An image transmission system comprising
an encoding processor configured to compress and to transmit an image signal and a decoding processor configured to expand the image signal received from the encoding processor, wherein the decoding processor comprises:
a reception memory configured to store the image signal;
a first frame buffer configured to store a first reference image;
a decoding processor configured to decode the image signal based on the first reference image and to generate a decoded image;
a first reference image storage configured to store the decoded image in the first frame buffer as the first reference image; and
an output image selection processor configured to select the first reference image stored in the frame buffer when the reception memory underflows and to select the decoded image when the reception memory does not underflow,
wherein the encoding processor comprises:
a second frame buffer configured to store a second reference image;
an encoding processor configured to generate an image where the image signal is encoded based on the second reference image stored in the second frame buffer; and
a second reference image storage configured to generate a local decoded image by decoding the image having been encoded and to store the local decoded image in the second frame buffer as the second reference image,
the image signal compressed by the encoding processor is stream data, and
the encoding processor halts encoding of the image signal when the image signal cannot be transmitted to the decoding processor, and when the image signal can be transmitted thereafter, encodes a present frame using a frame, where encoding has been halted, as the second reference image.

8. The image transmission system according to claim 7, wherein the first reference image stored in the first frame buffer is the compressed reference image where the decoded image is compressed, and
the first reference image storage stores the compressed reference image, compressed by a same method as that of the second reference image storage, in the first frame buffer.

9. The image transmission system according to claim 8, further comprising a first reference image expansion processor configured to output the first reference image, expanded from the compressed reference image, to the decoding processor and the output image selection processor.

10. The image transmission system according to claim 9, wherein the first reference image storage compresses the decoded image by each block, and
the output image selection processor outputs a composite image formed by a decoded part of the image signal and the first reference image, corresponding to an undecoded part, stored in the first frame buffer when decoding by the decoding processor is interrupted halfway in a frame due to the underflow.

11. The image transmission system according to claim 10, wherein the output image selection processor repeats outputting the composite image until the underflow is canceled.

12. The image transmission system according to claim 10, wherein the first reference image storage stores the decoded image divided into a plurality of blocks in the first frame buffer.

13. The image transmission system according to claim 7, wherein the first reference image storage stores the decoded image by each block in the frame buffer, and
the output image selection processor outputs a composite image where an undecoded part of a frame, output from the decoding processor, is interpolated from the block stored in the frame buffer when decoding by the decoding processor is interrupted halfway in the frame.

14. The image transmission system according to claim 7, wherein the first reference image storage stores the decoded image, compressed by each block, in the first frame buffer, and
the output image selection processor outputs a composite image formed by a decoded part of a frame where decoding has been interrupted and, from among the blocks in a preceding frame stored in the first frame buffer, the block corresponding an undecoded part when decoding by the decoding processor is interrupted halfway in the frame.

15. A decoding method comprising:
storing received image in a reception memory;
storing a reference image in a frame buffer;
decoding the received image based on the reference image and to generate a decoded image;
storing the decoded image in the frame buffer as the reference image;
selecting the reference image stored in the inner buffer when the reception memory underflows
selecting the decoded image when the reception memory does not underflow,
outputting the reference image having been expanded from the compressed reference image for decoding and selecting, compressing the decoded image stored in the buffer memory by each block, and outputting a composite image formed by a decoded part of the received image and the reference image, corresponding to an undecoded part, stored in the frame buffer when decoding is interrupted halfway in a frame due to the underflow, wherein the reference image stored in the frame buffer is the compressed reference image where the decoded image is compressed, and a capacity of the frame buffer is smaller than a capacity for two frames of the compressed reference image to store compressed pixel blocks of one frame and at least one pixel block within a limited searching range of motion search.

* * * * *